United States Patent
Warren et al.

(10) Patent No.: US 8,752,771 B2
(45) Date of Patent: Jun. 17, 2014

(54) THERMOSTAT BATTERY RECHARGING DURING HVAC FUNCTION ACTIVE AND INACTIVE STATES

(75) Inventors: Daniel Adam Warren, San Francisco, CA (US); Hugo Fiennes, Palo Alto, CA (US); Jonathan Alan Dutra, Saratoga, CA (US); David Bell, Los Altos Hills, CA (US); Anthony Michael Fadell, Portola Valley, CA (US); Matthew Lee Rogers, Los Gatos, CA (US)

(73) Assignee: Nest Labs, Inc., Palo Alto, CA (US)

( * ) Notice: Subject to any disclaimer, the term of this patent is extended or adjusted under 35 U.S.C. 154(b) by 544 days.

(21) Appl. No.: 13/034,678

(22) Filed: Feb. 24, 2011

(65) Prior Publication Data
US 2012/0126019 A1    May 24, 2012

Related U.S. Application Data

(60) Provisional application No. 61/415,771, filed on Nov. 19, 2010, provisional application No. 61/429,093, filed on Dec. 31, 2010.

(51) Int. Cl.
*F24F 11/053* (2006.01)
*G05D 23/12* (2006.01)
*G05D 23/185* (2006.01)
*G05D 23/00* (2006.01)

(52) U.S. Cl.
USPC .......................................... 236/1 C

(58) Field of Classification Search
USPC ..................... 236/1 C, 94; 700/276
See application file for complete search history.

(56) References Cited

U.S. PATENT DOCUMENTS

| | | | | |
|---|---|---|---|---|
| 3,948,441 | A | * | 4/1976 | Perkins et al. ............... 236/46 R |
| 3,991,357 | A | | 11/1976 | Kaminski |
| 4,157,506 | A | | 6/1979 | Spencer |
| 4,177,923 | A | | 12/1979 | Krump |
| 4,249,696 | A | | 2/1981 | Donnelly et al. |
| 4,308,991 | A | * | 1/1982 | Peinetti et al. ............... 236/46 R |

(Continued)

FOREIGN PATENT DOCUMENTS

| | | |
|---|---|---|
| EP | 207295 | 1/1987 |
| EP | 510807 | 10/1992 |

(Continued)

OTHER PUBLICATIONS

International Patent Application No. PCT/US2011/061344, International Search Report, mailed Jun. 7, 2012, 4 pages.

(Continued)

*Primary Examiner* — Frantz Jules
*Assistant Examiner* — Joseph Trpisovsky
(74) *Attorney, Agent, or Firm* — Kilpatrick Townsend & Stockton LLP

(57) ABSTRACT

A thermostat and related methods are described for controlling one or more functions, such as heating and cooling in an HVAC. According to some embodiments the thermostat includes a rechargeable battery; charging circuitry adapted and arranged to recharge the battery; and control circuitry adapted and arranged to control the one or more HVAC functions using power from the rechargeable battery. According to some embodiments, the thermostat also includes power harvesting circuitry adapted and arranged to harvest power from the HVAC system in cases where no common wire is available to the thermostat, and to supply power to the charging circuit for recharging the battery.

16 Claims, 7 Drawing Sheets

(56) References Cited

U.S. PATENT DOCUMENTS

| | | | |
|---|---|---|---|
| 4,460,125 A | 7/1984 | Barker et al. | |
| 4,528,459 A | 7/1985 | Wiegel | |
| 4,695,246 A | 9/1987 | Beilfuss et al. | |
| 4,842,510 A | 6/1989 | Grunden et al. | |
| 4,872,828 A | 10/1989 | Mierzwinski et al. | |
| 4,898,229 A | 2/1990 | Brown et al. | |
| 4,948,044 A | 8/1990 | Cacciatore | |
| 4,955,806 A | 9/1990 | Grunden et al. | |
| 5,107,918 A | 4/1992 | McFarlane et al. | |
| 5,127,464 A | 7/1992 | Butler et al. | |
| 5,158,477 A | 10/1992 | Testa et al. | |
| 5,175,439 A | 12/1992 | Haerer et al. | |
| 5,251,813 A | 10/1993 | Kniepkamp | |
| 5,255,179 A | 10/1993 | Zekan et al. | |
| 5,260,669 A * | 11/1993 | Higgins et al. | 327/3 |
| 5,277,363 A | 1/1994 | Hart | |
| 5,347,982 A | 9/1994 | Binzer et al. | |
| 5,352,930 A | 10/1994 | Ratz | |
| 5,381,950 A | 1/1995 | Aldridge | |
| 5,422,808 A | 6/1995 | Catanese, Jr. et al. | |
| 5,452,762 A | 9/1995 | Zillner, Jr. | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,506,569 A | 4/1996 | Rowlette | |
| 5,570,837 A | 11/1996 | Brown et al. | |
| 5,595,342 A | 1/1997 | McNair et al. | |
| 5,611,484 A | 3/1997 | Uhrich | |
| 5,635,896 A | 6/1997 | Tinsley et al. | |
| 5,646,349 A | 7/1997 | Twigg et al. | |
| 5,655,709 A | 8/1997 | Garnett et al. | |
| 5,697,552 A | 12/1997 | McHugh et al. | |
| 5,736,795 A | 4/1998 | Zuehlke et al. | |
| 5,808,294 A | 9/1998 | Neumann | |
| 5,903,139 A * | 5/1999 | Kompelien | 323/282 |
| 5,918,474 A | 7/1999 | Khanpara et al. | |
| 6,060,719 A | 5/2000 | DiTucci et al. | |
| 6,084,518 A | 7/2000 | Jamieson | |
| 6,089,310 A | 7/2000 | Toth et al. | |
| 6,213,404 B1 | 4/2001 | Dushane et al. | |
| 6,222,719 B1 | 4/2001 | Kadah | |
| 6,275,160 B1 | 8/2001 | Ha | |
| 6,315,211 B1 | 11/2001 | Sartain et al. | |
| 6,336,593 B1 | 1/2002 | Bhatnagar | |
| 6,356,038 B2 | 3/2002 | Bishel | |
| 6,509,838 B1 | 1/2003 | Payne et al. | |
| 6,513,723 B1 | 2/2003 | Mueller et al. | |
| 6,566,768 B2 | 5/2003 | Zimmerman et al. | |
| 6,622,925 B2 | 9/2003 | Carner et al. | |
| 6,657,418 B2 | 12/2003 | Atherton | |
| 6,743,010 B2 | 6/2004 | Bridgeman et al. | |
| 6,794,771 B2 | 9/2004 | Orloff | |
| 6,798,341 B1 | 9/2004 | Eckel et al. | |
| 6,886,754 B2 | 5/2005 | Smith et al. | |
| 6,956,463 B2 | 10/2005 | Crenella et al. | |
| 7,174,239 B2 | 2/2007 | Butler et al. | |
| 7,200,467 B2 | 4/2007 | Schanin et al. | |
| 7,476,988 B2 | 1/2009 | Mulhouse et al. | |
| 7,510,126 B2 | 3/2009 | Rossi et al. | |
| 7,537,171 B2 | 5/2009 | Mueller et al. | |
| 7,571,865 B2 | 8/2009 | Nicodem et al. | |
| 7,648,077 B2 | 1/2010 | Rossi et al. | |
| 7,673,809 B2 | 3/2010 | Juntunen | |
| 7,748,640 B2 | 7/2010 | Roher et al. | |
| 7,755,220 B2 | 7/2010 | Sorg et al. | |
| 7,775,452 B2 | 8/2010 | Shah et al. | |
| 7,841,542 B1 | 11/2010 | Rosen | |
| 7,900,849 B2 | 3/2011 | Barton et al. | |
| 8,091,375 B2 | 1/2012 | Crawford | |
| 8,415,829 B2 | 4/2013 | Di Cristofaro | |
| 2002/0074865 A1 | 6/2002 | Zimmerman et al. | |
| 2003/0037555 A1 | 2/2003 | Street et al. | |
| 2003/0064335 A1 | 4/2003 | Canon | |
| 2003/0090243 A1 | 5/2003 | Atherton | |
| 2003/0231001 A1 | 12/2003 | Bruning | |
| 2004/0120084 A1 | 6/2004 | Readio et al. | |
| 2004/0209209 A1 | 10/2004 | Chodacki et al. | |
| 2004/0245349 A1 | 12/2004 | Smith | |
| 2005/0043907 A1 | 2/2005 | Eckel et al. | |
| 2005/0145705 A1 | 7/2005 | Shah et al. | |
| 2005/0270151 A1 | 12/2005 | Winick | |
| 2006/0124759 A1 | 6/2006 | Rossi et al. | |
| 2006/0186214 A1 | 8/2006 | Simon et al. | |
| 2007/0045432 A1 | 3/2007 | Juntunen | |
| 2007/0095082 A1 | 5/2007 | Garrett et al. | |
| 2007/0114848 A1 * | 5/2007 | Mulhouse et al. | 307/43 |
| 2007/0131787 A1 | 6/2007 | Rossi et al. | |
| 2007/0228183 A1 | 10/2007 | Kennedy et al. | |
| 2007/0241203 A1 | 10/2007 | Wagner et al. | |
| 2007/0296280 A1 | 12/2007 | Sorg et al. | |
| 2008/0015742 A1 | 1/2008 | Kulyk et al. | |
| 2008/0054082 A1 | 3/2008 | Evans et al. | |
| 2008/0094010 A1 | 4/2008 | Black | |
| 2008/0147242 A1 | 6/2008 | Roher et al. | |
| 2009/0099697 A1 | 4/2009 | Li et al. | |
| 2009/0140057 A1 | 6/2009 | Leen | |
| 2009/0194601 A1 | 8/2009 | Flohr | |
| 2009/0236433 A1 | 9/2009 | Mueller et al. | |
| 2009/0259713 A1 | 10/2009 | Blumrich et al. | |
| 2010/0006660 A1 | 1/2010 | Leen et al. | |
| 2010/0070099 A1 | 3/2010 | Watson et al. | |
| 2010/0084482 A1 | 4/2010 | Kennedy et al. | |
| 2010/0182743 A1 | 7/2010 | Roher | |
| 2010/0193592 A1 | 8/2010 | Simon et al. | |
| 2011/0025257 A1 | 2/2011 | Weng | |
| 2011/0241624 A1 * | 10/2011 | Park et al. | 320/134 |
| 2011/0253796 A1 | 10/2011 | Posa et al. | |
| 2012/0017611 A1 | 1/2012 | Coffel et al. | |
| 2012/0248211 A1 | 10/2012 | Warren et al. | |

FOREIGN PATENT DOCUMENTS

| | | |
|---|---|---|
| EP | 660287 | 6/1995 |
| EP | 690363 | 1/1996 |
| EP | 2302326 | 3/2011 |
| JP | 09298780 | 11/1997 |
| WO | 2008054938 | 5/2008 |

OTHER PUBLICATIONS

Shadrach, "Energy Scavenging for Wireless Sensor Nodes with a Focus on Vibration to Electricity Conversion", Dissertation [online], retrieved from the Internet: <URL: http://users.cecs.anu.edu.au/~Shad.Roundy/paper/ShadThesis.pdf>, Jun. 2003, 297 pages.

* cited by examiner

THERMOSTAT BATTERY RECHARGING DURING HVAC FUNCTION ACTIVE AND INACTIVE STATES

CROSS-REFERENCE To RELATED APPLICATIONS

This patent application claims the benefit of the following commonly assigned applications: U.S. Prov. Ser. No. 61/415,771 filed Nov. 19, 2010; U.S. Prov. Ser. No. 61/429,093 filed Dec. 31, 2010. The subject matter of this patent application also relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/984,602 filed Jan. 4, 2011; U.S. Ser. No. 12/987,257 filed Jan. 10, 2011; U.S. Ser. No. 13/034,674 entitled "Thermostat Circuitry for Connection to HVAC Systems," filed on even date herewith; and U.S. Ser. No. 13/034,666 entitled "Thermostat Wiring Connector," filed on even date herewith. Each of the above-referenced patent applications is incorporated by reference herein.

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention generally relates to control systems for heating, ventilation and air conditioning (HVAC) systems. More particularly, embodiments of this invention relate to thermostats having jumper-free designs and/or isolation circuitry.

As is known, for example as discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two external connections required.

When electronics began to be used in thermostats the fact that the thermostat was not directly wired to both sides of the transformer for its power source created a problem. This meant either the thermostat had to have its own independent power source, such as a battery, or be hardwired directly from the system transformer. Direct hardwiring a "common" wire from the transformer to the electronic thermostat may be very difficult and costly. However, there are also disadvantages to using a battery for providing the operating power. One primary disadvantage is the need to continually check and replace the battery. If the battery is not properly replaced and cannot provide adequate power, the electronic thermostat may fail during a period of extreme environmental conditions.

Since many households did not have a direct wire from the system transformer (such as a "common" wire), some thermostats have been designed to derive power from the transformer through the equipment load. The methods for powering an electronic thermostat from the transformer with a single direct wire connection to the transformer is called "power stealing" or "power sharing." The thermostat "steals," "shares" or "harvests" its power during the "OFF" periods of the heating or cooling system by allowing a small amount of current to flow through it into the load coil below its response threshold (even at maximum transformer output voltage). During the "ON" periods of the heating or cooling system the thermostat draws power by allowing a small voltage drop across itself. Hopefully, the voltage drop will not cause the load coil to dropout below its response threshold (even at minimum transformer output voltage).

Examples of thermostats with power stealing capability include the Honeywell T8600, Honeywell T8400C, and the Emerson Model 1F97-0671. However, these systems do not have power storage means and therefore always rely on power stealing or must use disposable batteries.

U.S. Pat. No. 4,174,807 discusses the use of a rechargeable battery in an autocycling control circuit for heating and/or air conditioning systems. However, the battery is only used in the event of a power failure and then only to keep the digital clock and timing sequence program from being disrupted.

U.S. Pat. Nos. 6,566,768 and 5,903,139 discuss the use of power stealing in combination with a capacitor used to store power. The discussed systems, however lack the ability to power steal from HVAC systems having two power transformers, such as the case when an existing HVAC heating system is subsequently upgraded to add air conditioning and a second power transformer is installed. Additionally, the discussed systems do not have the capability to charge a battery.

SUMMARY

According to some embodiments a thermostat is provided for controlling one or more HVAC functions in an HVAC system. The thermostat includes a rechargeable battery; charging circuitry adapted and arranged to recharge the battery; and control circuitry adapted and arranged to control the one or more HVAC functions using power from the rechargeable battery. According to some embodiments, the thermostat also includes power harvesting circuitry adapted and arranged to harvest power from the HVAC system in cases where no common wire is available to the thermostat, and to supply power to the charging circuit for recharging the battery.

The power harvesting circuitry is preferably adapted and arranged to automatically select harvesting power from a power source among two or more available power sources. According to some embodiments, the power harvesting circuitry is adapted and arranged to harvest power from a circuit of the HVAC functions during times when the HVAC functions are active or inactive. During power harvesting from a circuit of an HVAC function when the HVAC function is active, the power harvesting circuitry, according to some embodiments, repeatedly charges and discharges one or more capacitive and/or magnetic elements to store electrical energy for use by the charging circuit and/or other operations in the thermostat. The power harvesting circuitry can includes solid state switching components and circuitry adapted and arranged to quickly open and close one or more circuits controlling the one or more HVAC functions.

According to some embodiments, the charging circuitry is adapted to charge the battery such that longer cycle life is preferred over higher charge capacity, such as controlling the ratio of charge current to total capacity, and/or limiting the float voltage.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "HVAC" includes systems providing both heating and cooling, heating only, cooling only, as well as systems that provide other occupant comfort and/or conditioning functionality such as humidification, dehumidification and ventilation.

As used herein the term "thermostat" includes any device, instrument and/or system for controlling at least some aspect of an HVAC system. While it is very common for a thermostat to control an HVAC system primarily based on temperature, the term includes controlling devices, for example, that control an HVAC system based on other parameters such as humidity.

As used herein the term "residential" when referring to an HVAC system means a type of HVAC system that is suitable to heat, cool and/or otherwise condition the interior of a building that is primarily used as a single family dwelling An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "common wire" when referring to HVAC systems refers to a direct wire from an HVAC power transformer that is in addition to the power or return wire to the transformer. Thus, power can be drawn from a circuit including the common wire and the power or return wire without risk of switching on or off relays, switches and/or contactors for operating various HVAC systems since those switching means are not in series in such a circuit.

As used herein the term "silent" or "silently" when referring to thermostat operation and/or control means that any sound made by the thermostat is generally inaudible to the human ear at a range of greater than 1 meter.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
FIG. 1 is a diagram of an enclosure with an HVAC system, according to some embodiments.

FIG. 1 is a diagram of an enclosure with and HVAC system, according to some embodiments. Enclosure 100, in this example is a single-family dwelling According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons.

Figure 2:
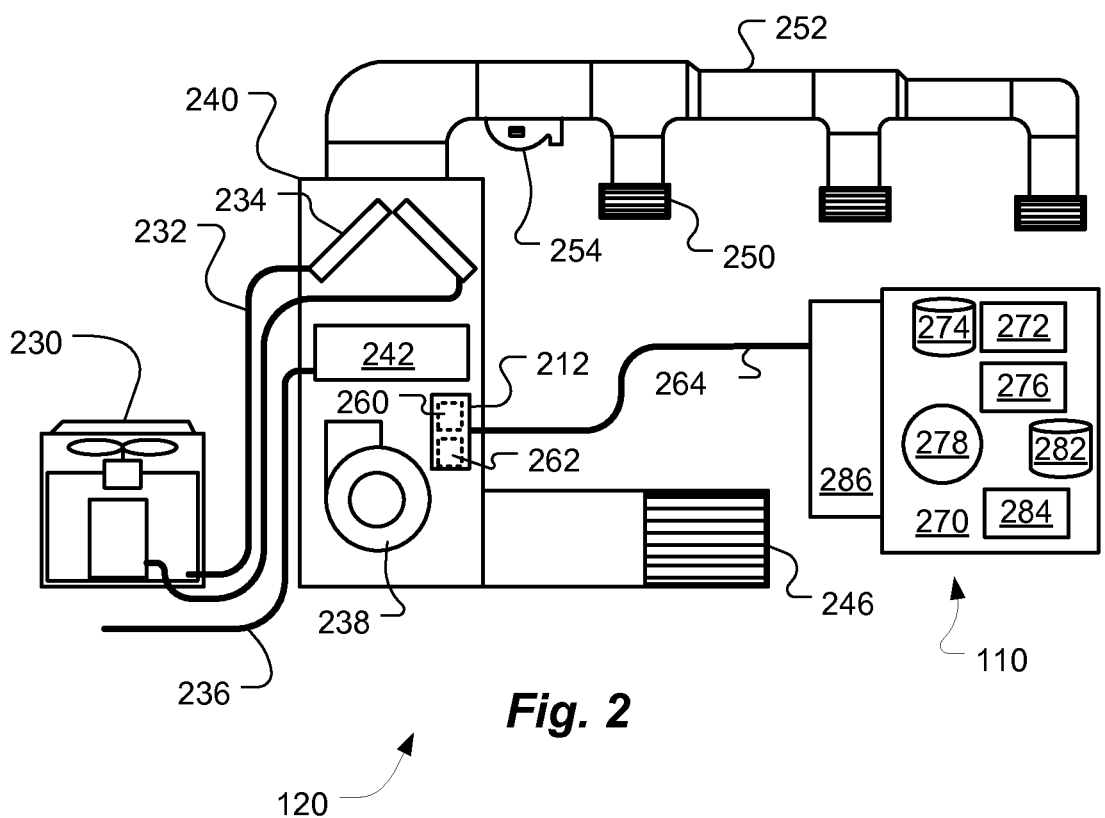
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used such as hydronic, in-floor radiant heating, heat pump, etc. In heating, heating coils or elements 242 within air handler 240 provide a source of heat using electricity or gas via line 236. Cool air is drawn from the enclosure via return air duct 246 through fan 238 and is heated heating coils or elements 242. The heated air flows back into the enclosure at one or more locations via supply air duct system 252 and supply air grills such as grill 250. In cooling an outside compressor 230 passes gas such as freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems.

Thermostat 110 controls the HVAC system 120 through a number of control circuits. In particular, there are often separate control systems for heating and cooling. The heating system can include a low voltage, for example 24 VAC, operated gas valve which controls the flow of gas to the furnace; the cooling system includes a contactor having a low-voltage coil and high-voltage contacts which control energizing of the compressor; and the circulation system includes a fan relay having a low-voltage coil and high-voltage contacts which control energizing of the fan which circulates the conditioned air. The electrical power for energizing such low-voltage operated devices is provided either by a single transformer 260 for both heating and cooling, or by two separate transformers 260 for heating and 262 for cooling. Often, a single transformer is provided when the heating and cooling system is installed as a complete unit. If the cooling system is added to an existing heating system, sometimes an additional transformer is used.

According to some embodiments, the thermostat 110 is split into two parts: a head unit 270 and a backplate 286. The head unit 270 contains a main processor 272, storage 274 (such as flash storage), local area wireless networking 276, and display and user interface 278. Also included are environmental sensors such as temperature, humidity and/or pressure. A rechargeable battery 282 and power management subsystems 284 are also included as will be described in further detail herein. The head unit 270 is removable by the user and can be connected to a computer for configuration.

The backplate 286 installs on the wall and interfaces with the HVAC wiring 264. Backplate 286 provides power to the head unit 270 and also facilitates control of the attached HVAC systems, which in FIG. 2 is heating and cooling but could include other functions such as humidification, dehumidification and ventilation. According to some embodiments, backplate 286 also include a cellular wireless interface. Components within backplate 286 will be described in further detail herein.

Figure 3:
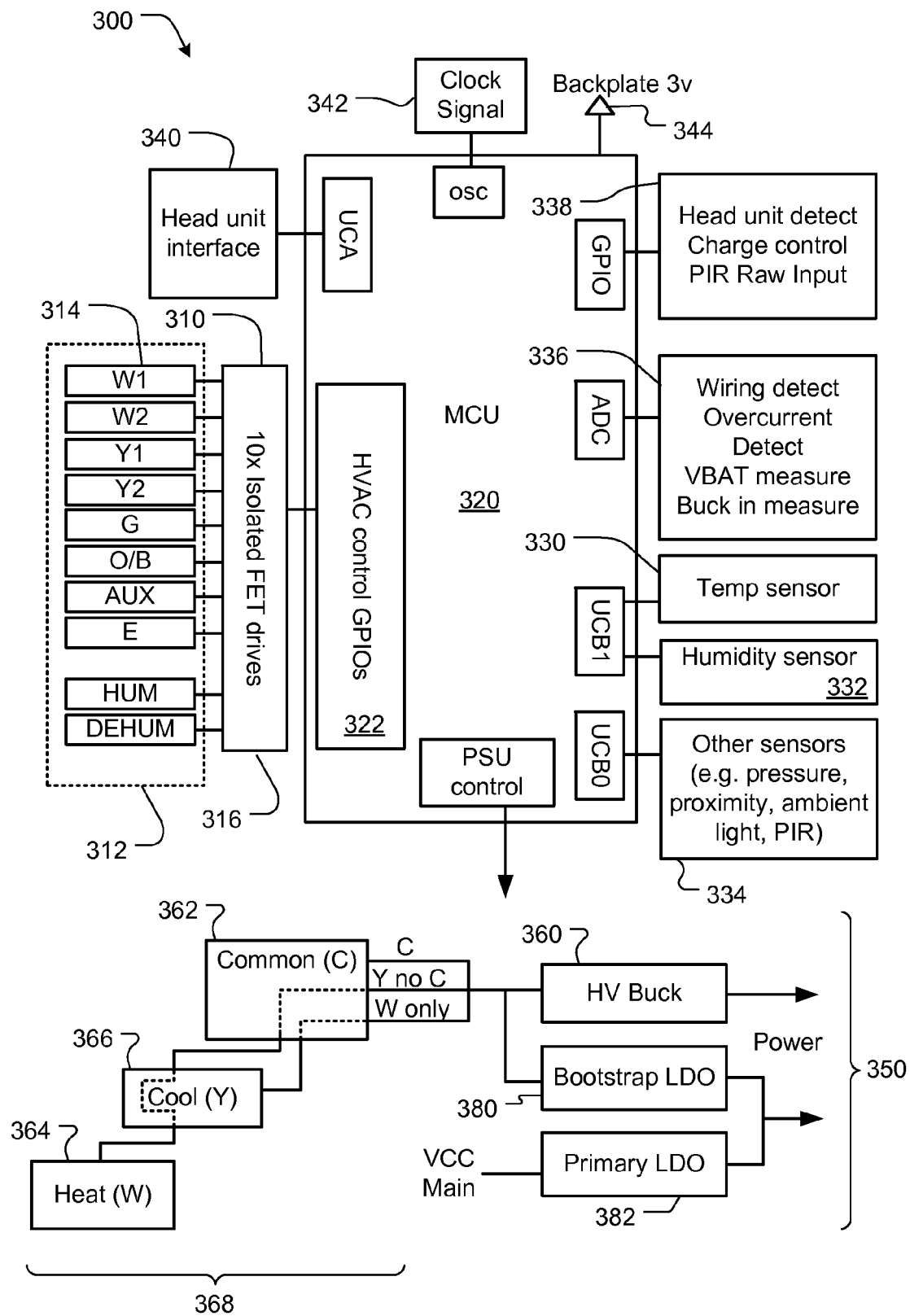
FIG. 3 is a block diagram of some circuitry of a thermostat, according to some embodiments.

FIG. 3 is a block diagram of some circuitry of a thermostat, according to some embodiments. Circuitry 300, according to some embodiments, is a backplate of a thermostat. A number of HVAC wires can be attached using HVAC terminals 312. One example of which is the W1 terminal 314. Each terminal is used to control an HVAC function. According to some embodiments, each of the wires from the terminals W1, W2, Y1, Y2, G, O/B, AUX and E is connected to a separate isolated FET drive within 310. The common HVAC functions for each of the terminals are: W1 and W2 heating; Y1 and Y2 for cooling; G for fan; O/B for heatpumps; and E for emergency heat. Note that although the circuitry 300 is able control 8 functions using the isolated FET drives 310, according to some embodiments, other functions, or fewer functions can be controlled. For example circuitry for a more simply equipped HVAC system may only have a single heating (W), and single cooling (Y) and a fan (G), in which case there would only be three isolated FET drives 310. According to a preferred embodiment, 5 FET drives 310 are provided, namely heating (W), cooling (Y), fan (G), auxiliary (AUX) and compressor direction (O/B). Not shown are the circuit returns such as RH (return for heat) and RC (return for cooling). According to some embodiments the thermostat can control a humidifier and/or de-humidifier. Further details relating to isolated FET drives 310 are described in co-pending U.S. patent application Ser. No. 13/034,674, entitled "Thermostat Circuitry for Connection to HVAC Systems," filed on even date herewith which is incorporated herein by reference.

The HVAC functions are controlled by the HVAC control general purpose input/outputs (GPIOs) 322 within MCU 320. MCU 320 is a general purpose microcontroller such as the MSP430 16-bit ultra-low power MCU available from Texas Instruments. MCU 320 communicates with the head unit via Head Unit Interface 340. The head unit together with the backplate make up the thermostat. The head unit has user interface capability such that it can display information to a user via an LCD display and receive input from a user via buttons and/or touch screen input devices. According to some embodiments, the head unit has network capabilities for communication to other devices either locally or over the internet. Through such network capability, for example, the thermostat can send information and receive commands and setting from a computer located elsewhere inside or outside of the enclosure. The MCU detects whether the head unit is attached to the backplate via head unit detect 338.

Clock 342 provides a low frequency clock signal to MCU 320, for example 32.768 kHz. According to some embodiments there are two crystal oscillators, one for high frequency such as 16 MHz and one for the lower frequency. Power for MCU 320 is supplied at power input 344 at 3.0 V. Circuitry 336 provides wiring detection, battery measurement, and buck input measurement. A temperature sensor 330 is provided, and according to some embodiments and a humidity sensor 332 are provided. According to some embodiments, one or more other sensors 334 are provided such as: pressure, proximity (e.g. using infrared), ambient light, and pyroelectric infrared (PIR).

Power circuitry 350 is provided to supply power. According to some embodiments, when the thermostat is first turned on with insufficient battery power, a bootstrap power system is provided. A high voltage low dropout voltage regulator (LDO) 380 provides 3.0 volts of power for the bootstrap of the MCU 320. The bootstrap function can be disabled under MCU control but according to some embodiments the bootstrap function is left enabled to provide a "safety net" if the head unit supply vanishes for any reason. For example, if the head-unit includes the re-chargeable battery 384 and is removed unexpectedly, the power would be lost and the bootstrap function would operate. The input to this Bootstrap LDO 380 is provided by connectors and circuitry 368 that automatically selects power from common 362 (highest priority), cool 366 (lower priority); or heat (lowest priority) 364.

In normal operation, a 3.0 volt Primary LDO 382 powers the backplate circuitry and itself is powered by VCC Main. According to some embodiments, high voltage buck 360 is provided as a second supply in the backplate. The input to this supply is the circuitry 368. According to some embodiments, the high voltage buck 380 can supply a maximum of 100 mA at 4.5 v. According to some embodiments, the VCC main and the Primary LDO 382 can be powered by a rechargeable battery (shown in FIG. 7) in cases where there is no alternative power source (such as the high voltage buck or USB power, for example).

Figure 4C:
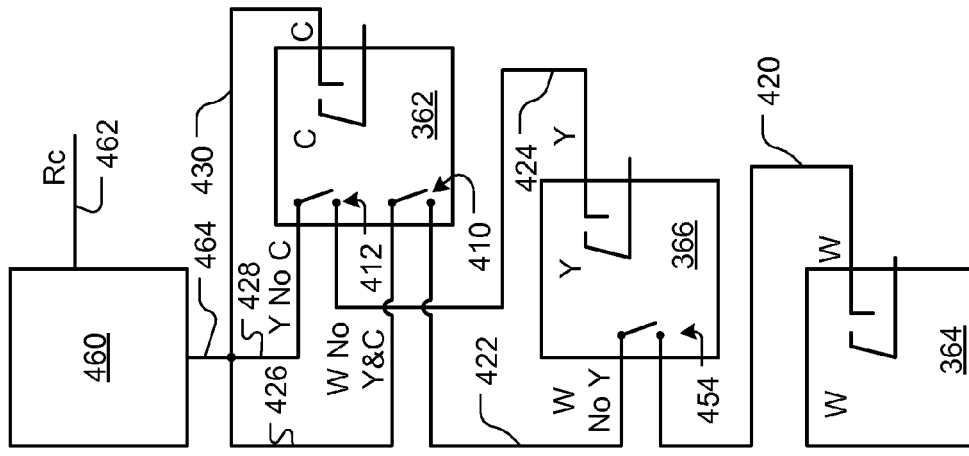
FIGS. 4A-C schematically illustrate the use of auto-switching connectors being used to automatically select a source for power harvesting, according to some embodiments.
Figure 4B:
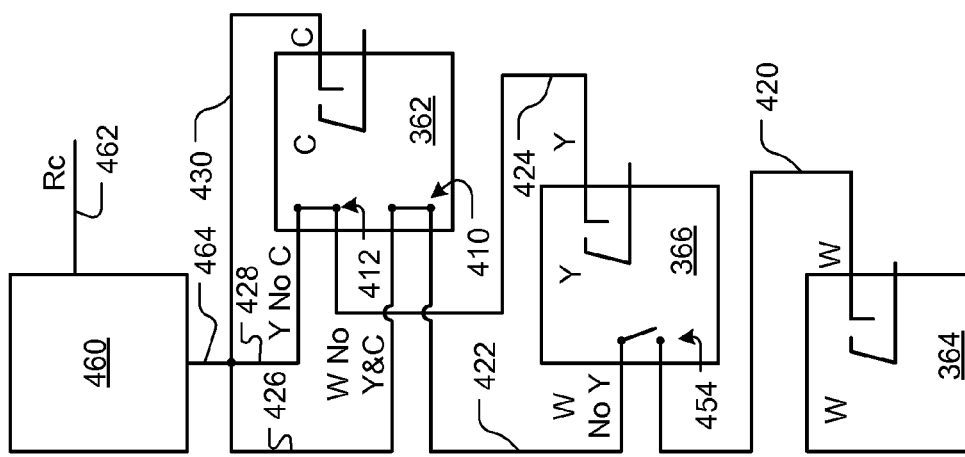
Figure 4A:
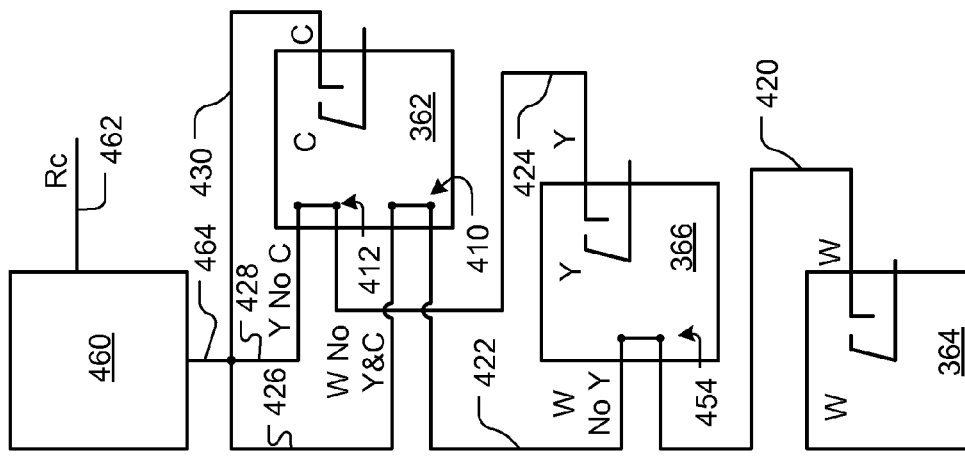

FIGS. 4A-C schematically illustrate the use of auto-switching connectors being used to automatically select a source for power harvesting, according to some embodiments. The connectors 362, 364, and 366 are connectors as shown in FIG. 3. For further details regarding preferred automatically switching connectors, see co-pending U.S. patent application Ser. No. 13/034,666, entitled "Thermostat Wiring Connector" filed on even date herewith and incorporated herein by reference. The connector 362 is used for connection to an HVAC "C" (common) wire and includes two switched pairs of normally closed secondary conductors 410 and 412. The connector 366 is used for connection to an HVAC "Y"

(cooling) wire and includes one switched pair of normally closed secondary conductors 454. The connector 364 is used for connection to an HVAC "W" (heating) wire. Note that although not shown in FIGS. 4A-C, one or more additional pairs of switched secondary conductors can be provided with any of the connectors 362, 366 and 365, such as could be used for the purpose of electronically detecting the presence of an HVAC system wire to the connector. Power harvesting circuitry 460 is used to supply power to the thermostat and is also connected to the Rc wire 462 (or according to other embodiment the Rh wire). For example, the power harvesting circuitry 460 can include the HV buck 360 and Bootstrap LDO 380 as shown in and described with respect to FIGS. 3 and 6A-B.

FIG. 4A shows the case of the switches 454, 410 and 412 when no C wire and no Y wire is attached. In this case all of the switches 454, 410 and 412 are closed and the power harvesting circuitry 460 is connected at input 464 with the W wire via circuit paths 420, 422 and 426. FIG. 4B shows the case of the switches 454, 410 and 412 when no C wire is attached but there is a Y wire attached. In this case switches 410 and 412 are closed but switch 454 is opened due to the presence of the Y wire. In this case the power harvesting circuitry 460 is connected at input 464 with the Y wire via circuit paths 424 and 428. FIG. 4C shows the case of the switches 454, 410 and 412 when both C and Y wires are attached. In this case all the switches 454, 410 and 412 are open and the power harvesting circuitry 460 is connected at input 464 with the C wire via circuit path 430. Note that the case of a connection of C and W wires and no Y wire is not shown but that in this case the W wire would not be connected to circuitry 420 since switch 410 would be open. Thus, through the use of circuitry and the connectors shown, the power harvesting circuitry is automatically switched so as to use connections to C, Y and W wires in decreasing order of priority. Preferably, the C wire is the highest priority as this ordinarily provides the best power source, if available. Note that according to some embodiments, the Y and W priorities are reversed to make W higher priority than Y.

Figure 5:
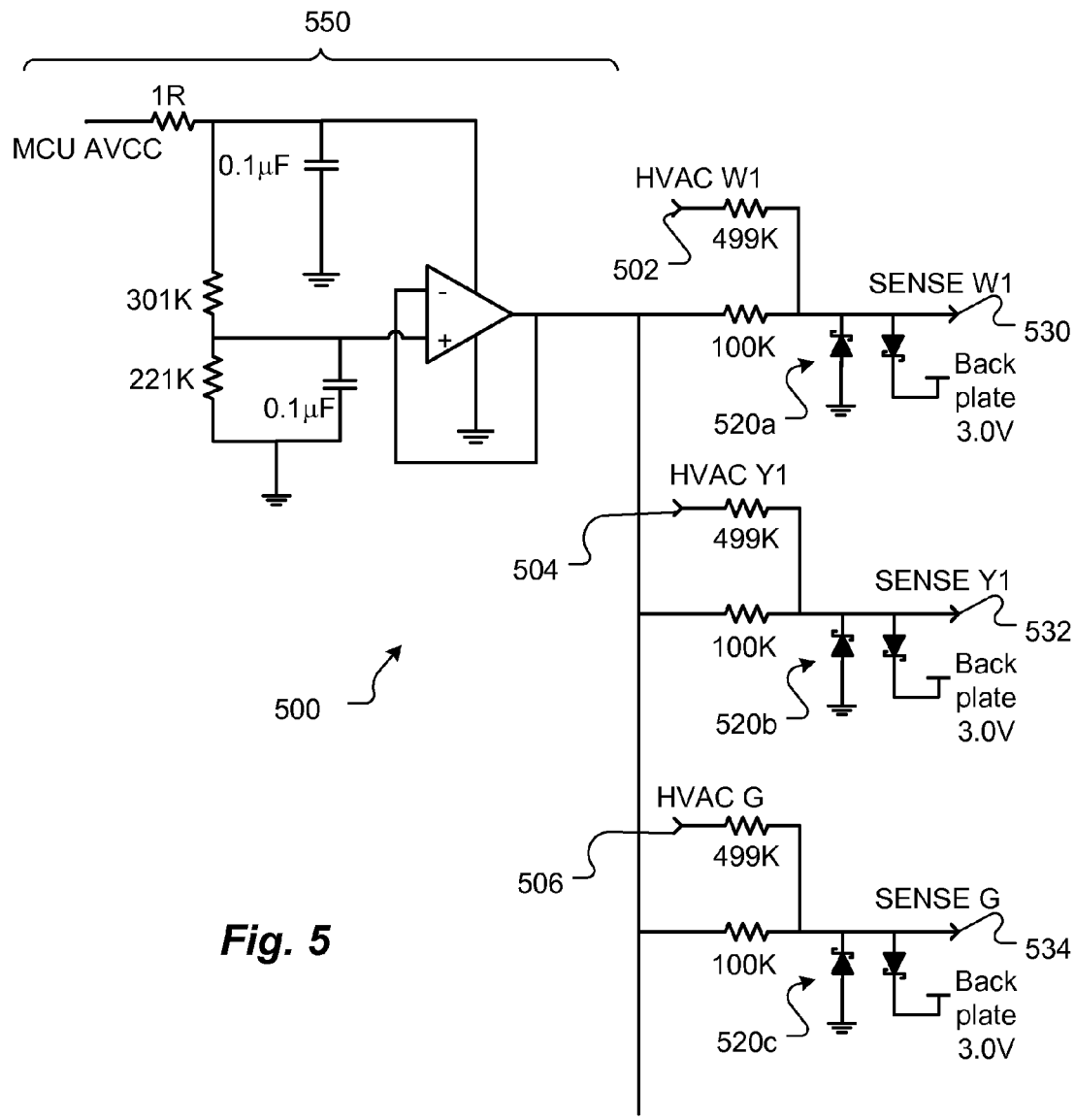
FIG. 5 is a schematic of a half-bridge sense circuit, according to some embodiments.

FIG. 5 is a schematic of a half-bridge sense circuit, according to some embodiments. Circuit 500 provides voltage sensing, clipped to 3.0 volts, for presence detection and current sensing. At inputs 502, 504 and 506 are the 24 VAC waveforms from three of the HVAC circuits. In the case shown in FIG. 5, inputs 502, 504 and 506 are for HVAC W1, HVAC Y1 and HVAC G, respectively. The sense input bias buffer 550 is provided as shown. Note that a voltage divider is used in each case that takes the voltage from 24 volts to approximately 4 volts. Clamp diodes 520a, 520b and 520c ensure that the voltage goes no higher or lower than the range of the microcontroller 320 (shown in FIG. 3). The Sense outputs 530, 532 and 534 are connected to the microcontroller 320 so that the microcontroller 320 can sense the presence of a signal on the HVAC lines. The circuits are repeated for the other HVAC lines so that the microcontroller can detect signals on any of the HVAC lines.

Figure 6A:
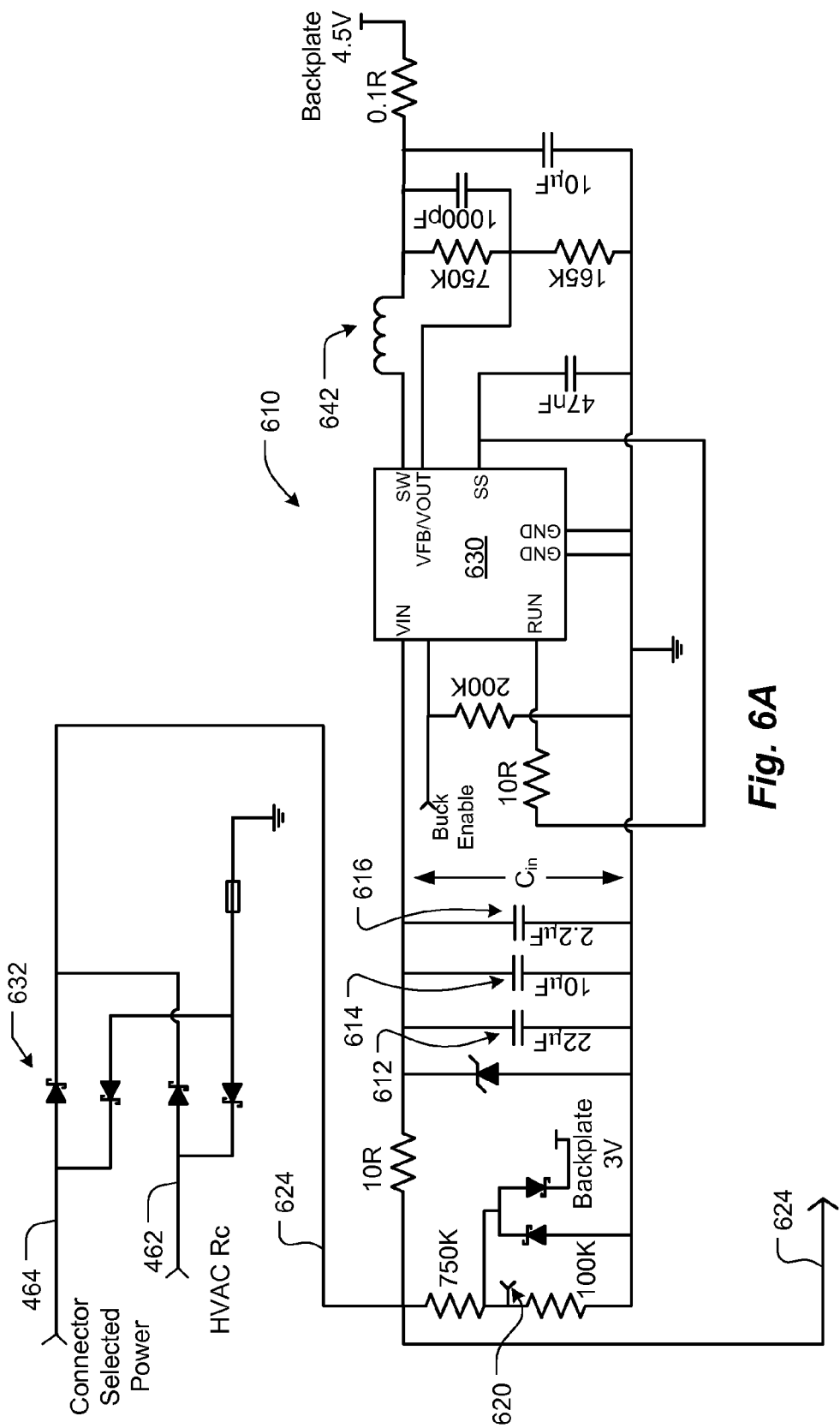
FIGS. 6A-B are schematics showing the high voltage buck, bootstrap LDO and battery LDO power circuitry, according to some embodiments.
Figure 6B:
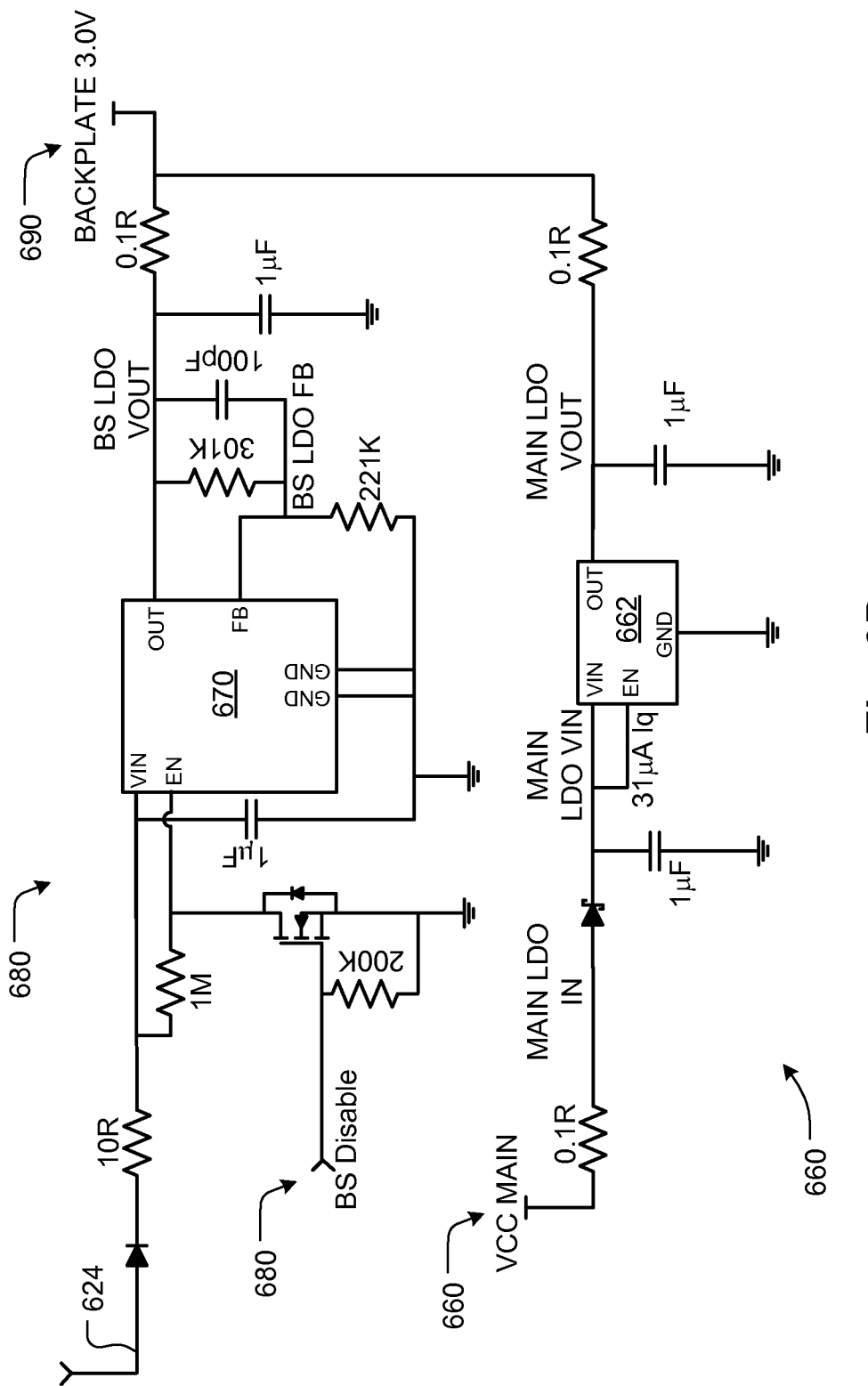

FIGS. 6A-B are schematics showing the high voltage buck, bootstrap LDO and battery LDO power circuitry, according to some embodiments. FIG. 6A shows the input 464 from the connector selected power, which corresponds to input 464 to power circuitry 460 in FIG. 4. The diodes 632 are used to rectify the AC power signal from the HVAC power transformer wire that is selected by the connector circuitry shown in FIG. 4. When the thermostat is installed in a building having two HVAC power transformers, such as may be the case when an existing HVAC heating-only system is upgraded to add an HVAC cooling system. In such cases, there are two power wires from the HVAC system, often called "Rh" the power wire directly from the heating system transformer, and "Rc" the power wire directly from the cooling transformer. Input 462 is from a terminal connected to the Rc wire. According to some embodiments, the Rc and Rh terminals are switched using automatic switching or other jumperless design, as shown and described in co-pending U.S. patent application Ser. No. 13/034,674, entitled "Thermostat Circuitry for Connection to HVAC Systems," filed on even date herewith and which is incorporated herein by reference.

Rectified input 624 is input to the high voltage buck circuit 610, according to some embodiments. In buck circuit 610, which corresponds to high voltage buck 360 in FIG. 3, the voltage on the input capacitors 612, 614 and 616 of high voltage buck 610 can be measured by the MCU 320 (of FIG. 3) at node 620, allowing the MCU to momentarily open the W1 or Y1 contacts during an "enabled" or "on" phase in order to recharge the buck input capacitors 612, 614 and 616 and continue power harvesting. According to some embodiments, the same HVAC circuit (e.g. heating or cooling) is used for power harvesting, whether or not there is more than one HVAC function in the system. According to some other embodiments, when the thermostat is used with an HVAC system having two circuits (e.g. heating and cooling), the system will power harvest from the non-activated circuit. In cases where a common wire is available from the HVAC power transformer, the system preferably does not power harvest at all from the heating and cooling circuits. According to some embodiments, the step down converter 630 is a high efficiency, high voltage 100 mA synchronous step-down converter such as the LTC3631 from Linear Technology. According to some embodiments, inductor 642 is a 100 uH power inductor such as the MOS6020 from Coilcraft. According to some embodiments, one or more other types of elements in addition to or instead of input capacitors 612, 614 and 616 are used to store electrical energy during power harvesting when the HVAC function is active (or "on"). For example, magnetic elements such as inductors and/or transformers can be used.

In order to control the HVAC functions, the HVAC function wire is shorted to the return or power wire. For example, in the case of heating, the W wire is shorted to the Rh (or R or Rc depending on the configuration). In the case of cooling the Y wire is shorted to the Rc (or R or Rh depending on the configuration). By shorting these two wires, the 24 VAC transformer is placed in series with a relay that controls the HVAC function. However, for power harvesting, a problem is that when these wires are shorted, there is no voltage across them, and when open, there is no current flow. Since Power=Voltage*Current, if either quantity is zero the power that can be extracted is zero. According to some embodiments, the power harvesting circuitry allows power to be taken from the two wires in both the states of HVAC—the HVAC "on" and the HVAC "off".

In the HVAC "off" state, some energy can be harvested from these two wires by taking less energy than would cause the of the relay to turn on, which would cause the HVAC function to erroneously turn on. Based on testing, it has been found that HVAC functions generally do not turn on when (0.040 A*4.5V)=0.180 watts is extracted at the output. So after the input diodes, capacitors, and switching regulator, this allows us to take 40 mA at 4.5 volts from these wires without turning on the HVAC system.

In the HVAC "on" state, the two wires must be connected together to allow current to flow, which turns on the HVAC relay. This, however, shorts out the input supply, so our system does not get any power when the HVAC "on" switch is closed. To get around this problem, the voltage is monitored on the capacitors 612, 614 and 616 at the input switching power supply node 620. When the voltage on these capacitors "$C_{in}$" drops close to the point at which the switching power supply would "Drop out" and lose output regulation, for example at about +8 Volts, the HVAC "on" switch is turned off and $C_{in}$ is charged. During the time that $C_{in}$ is charging, current is still flowing in the HVAC relay, so the HVAC relay stays on. When the capacitor voltages increases some amount, for example about +16 Volts, the HVAC "on" switch is closed again, begins to discharge while it feeds the switching regulator, and current continues to flow in the HVAC relay. Note that $C_{in}$ is not allowed to discharge back to the HVAC "on" switch due to input diodes 632. When the voltage on $C_{in}$ drops to about +8 Volts the HVAC "on" switch is turned off and the process repeats. This continues until the system tells the HVAC "on" switch to go off because HVAC is no longer needed. According to some embodiments, the ability of the HVAC "on" switch to turn on and off relatively quickly is provided by circuitry 450 as shown in and described with respect to FIG. 4 of co-pending U.S. patent application Ser. No. 13/034,674, entitled "Thermostat Circuitry for Connection to HVAC Systems," filed on even date herewith, which is incorporated herein by reference.

According to some embodiments, one or more alternative power harvesting techniques are used. For example, rather than having the HVAC "on" switch turn on when the voltage on reaches a certain point, it the system might turn off the "HVAC "on" switch for a predetermined period of time instead. According to some embodiments, power harvesting is enhanced by synchronizing the power harvesting with the AC current waveform.

FIG. 6B is a schematic of high voltage low dropout voltage regulators used to provide bootstrap power and battery, according to some embodiments. The bootstrap LDO circuitry 680, and battery LDO circuitry correspond to the bootstrap LDO 380 and battery LDO 382 in FIG. 3 respectively. Rectified input 624 is input to bootstrap circuit 680. According to some embodiments, regulator 670 is low-dropout linear regulator such as the TPS79801 from Texas Instruments. The output power 690 is provided to the backplate at 3.0V. The bootstrap disable signal 680 can be used to disable the bootstrap power unit, as shown. The input 660 comes from VCC main, which can be, for example, from the rechargeable battery. According to some embodiments, the low dropout regulator 662 is a low quiescent current device designed for power-sensitive applications such as the TLV70030 from Texas Instruments.

Figure 7:
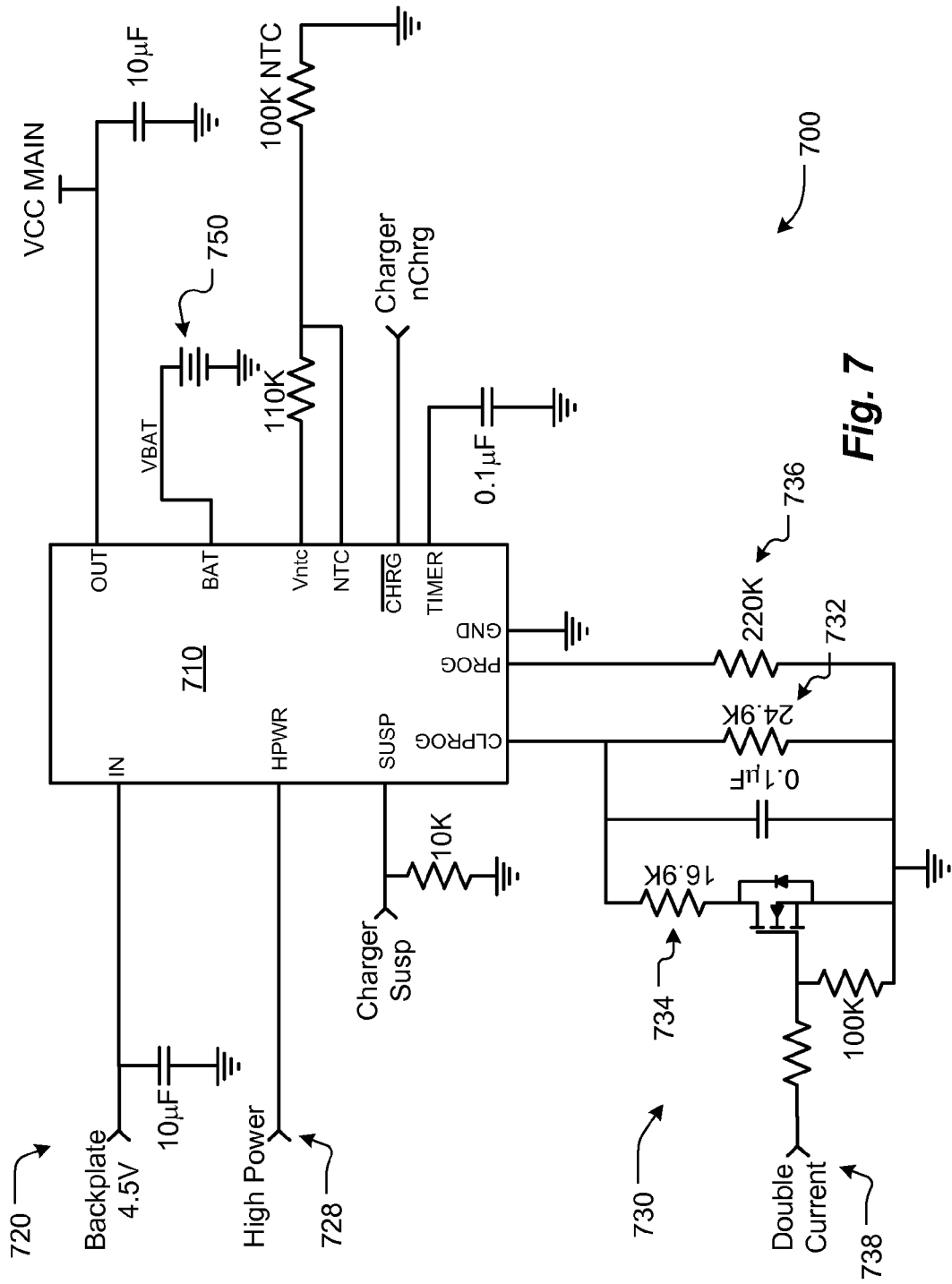
FIG. 7 shows a battery charging circuit and rechargeable battery, according to some embodiments.

FIG. 7 shows a battery charging circuit 700 and rechargeable battery, according to some embodiments. The charger 710 is used to charge the lithium-ion battery 750. In general, li-ion battery capacity depends on what voltage the battery is charged to, and the cycle life depends on the charged voltage, how fast the battery is charged and the temperature during which the battery is charged. Ordinarily, Li-ion batteries are charged at about 4.2V. In some cases the charging voltage is even higher in an attempt to gain greater capacity, but at the expense of decreased cycle life. However, in the case of the rechargeable battery 750 for use with a wall-mounted thermostat, a greater cycle life is preferred over capacity. High capacity is generally not needed since charging power is available via the power harvesting circuitry, and greater cycle life is preferred since user replacement may be difficult or unavailable. Thus, according to some embodiments, a low charging speed, low final float voltage and reduced charging temperature range is preferred. According to some embodiments, a final float voltage of between 3.9V and 4.1V is used. According to some embodiments a final float voltage of less than 4.0V is used, such as 3.95V. According to some embodiments, the ratio of charge current to total capacity "C" is also controlled, such as charging the battery to 0.2C (0.2 times the rated capacity) to provide better cycle life than a higher ratio. According to some embodiments, using a lower charging current aids in avoiding unintended tripping of the HVAC relay.

According to some embodiments, charger 710 is a USB power manager and li-ion battery charger such as the LTC4085-3 from Linear Technology. Backplate voltage 720 is input to charger 710. The circuitry 730 is used to select the charging current. In particular the value of resistor 732 (24.9 k) in parallel with resistor 734 (16.9 k) in combination with the inputs Double Current 738 and High Power 728 are used to select the charging current. If High Power 728 and Double Current 738 are both set to 0, then the charging current is 8.0 mA; if the High Power 728 is set to 0 and Double Current 738 is set to 1, then the charging current is 19.9 mA; if the High Power 728 is set to 1 and Double Current 738 is set to 0, then the charging current is 40.1 mA; and if the High Power 728 and Double Current 738 are both set to 1, then the charging current is 99.3 mA. Resistor 736 is used to set the default charge current. In the case shown, a 220 k resistor set the default charge current to 227 mA. According to some embodiments, a charge temperature range of 0-44 degrees C. is set via the Thermistor Monitoring Circuits.

According to some embodiments, the thermostat is capable of being powered by a USB power supply. This could be supplied by a user, for example, by attaching the thermostat via a USB cable to a computer or another USB power supply. In cases there a USB power supply is available, it is selected as the preferred power source for the thermostat and can be used to recharge the rechargeable battery. According to some embodiments, a charge current of about 227 mA is used when a USB supply source is available; a charge current of about 100 mA is used when an HVAC common wire is present; and a charge current of between about 20-40 mA is used when power is harvested from an HVAC heating and/or cooling circuit.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A thermostat for controlling one or more HVAC functions in an HVAC system the thermostat comprising:
   a rechargeable battery;
   charging circuitry adapted and arranged to recharge the battery;
   power harvesting circuitry adapted and arranged to harvest power from a circuit of an HVAC function during times when the HVAC function is active and during times when the HVAC function is inactive, and to supply power to the charging circuit for recharging the battery, wherein during the times when the HVAC function is active, the power harvesting circuitry repeatedly charges and discharges a capacitive element to store electrical energy for use by the charging circuitry by repeatedly opening and closing a solid-state switching circuit for activating the HVAC function, such that during times when the solid-state switching circuit is closed, the HVAC function continues uninterrupted while simultaneously charging the capacitive element; and control circuitry adapted and arranged to control the one or more HVAC functions using power from the rechargeable battery.

2. A thermostat according to claim 1 wherein the power harvesting circuitry is adapted and arranged to automatically select harvesting power from a power source among two or more available power sources.

3. A thermostat according to claim 1 wherein during power harvesting from the circuit of the HVAC function during the times when the HVAC function is active, the power harvesting circuitry operates according to the steps of:

monitoring a voltage associated with a charge level of said capacitive element:

instantiating said charging of said capacitive element when said voltage is below a lower threshold; and terminating said charging of said charging of said capacitive element when said voltage exceeds an upper threshold.

4. A thermostat according to claim 1 wherein the thermostat is adapted to control HVAC systems having more than one power transformer.

5. A thermostat according to claim 1 wherein the charging circuitry is adapted to charge the battery such that longer cycle life is preferred over higher charge capacity.

6. A thermostat according to claim 5 wherein the charging circuitry is adapted to charge the battery to a final float voltage of less than about 4.1V.

7. A thermostat according to claim 6 wherein the charging circuitry is adapted to charge the battery to a final float voltage of between about 3.9V and 4.0V.

8. A method for controlling an HVAC system having an HVAC function, the method comprising:

harvesting power from a circuit of an HVAC function during times when the HVAC function is active and during times when the HVAC function is inactive, wherein during the times when the HVAC function is active, the power harvesting circuitry repeatedly charges and discharges a capacitive element to store electrical energy for use by a charging circuitry by repeatedly opening and closing a solid-state switching circuit for activating the HVAC function, such that during times when the solid-state switching circuit is closed, the HVAC function continues uninterrupted while simultaneously charging the capacitive element;

charging a rechargeable battery using the charging circuitry; and controlling one or more HVAC functions using power from at least the rechargeable battery.

9. A method according to claim 8 wherein the HVAC function is heating or cooling.

10. A method according to claim 8 wherein during power harvesting from the circuit of the HVAC function during the times when the HVAC function is active, the power harvesting circuitry operates according to the steps of:

monitoring a voltage associated with a charge level of said capacitive Element;

instantiating said charging of said capacitive element when said voltage is below a lower threshold; and terminating said charging of said charging of said capacitive element when said voltage exceeds an upper threshold.

11. A method according to claim 10 wherein the power harvesting circuitry includes solid state switching components and circuitry adapted and arranged to quickly open and close the circuit for controlling the HVAC function.

12. A method according to claim 8 wherein the thermostat is adapted to control HVAC systems having more than one power transformer.

13. A method according to claim 8 wherein the charging circuitry is adapted to charge the battery such that longer cycle life is preferred over higher charge capacity.

14. A method according to claim 13 wherein the charging circuitry is adapted to charge the battery to a final float voltage of less than about 4.1V.

15. A method according to claim 14 wherein the charging circuitry is adapted to charge the battery to a final float voltage of between about 3.9V and 4.0V.

16. A thermostat according to claim 1 wherein the HVAC function is heating or cooling.

* * * * *

UNITED STATES PATENT AND TRADEMARK OFFICE
CERTIFICATE OF CORRECTION

| | |
|---|---|
| PATENT NO. | : 8,752,771 B2 |
| APPLICATION NO. | : 13/034678 |
| DATED | : June 17, 2014 |
| INVENTOR(S) | : Daniel Adam Warren et al. |

It is certified that error appears in the above-identified patent and that said Letters Patent is hereby corrected as shown below:

In the Claims:

Column 11, Line 16 - Please omit ":" and replace with -- ; --.
Column 12, Line 17 - Please omit "Element" and replace with -- element --.

Signed and Sealed this
Seventh Day of October, 2014

Michelle K. Lee
*Deputy Director of the United States Patent and Trademark Office*